(12) United States Patent
Hojsik et al.

(10) Patent No.: US 11,368,325 B2
(45) Date of Patent: Jun. 21, 2022

(54) SYSTEM FOR COMMUNICATION ON A NETWORK

(71) Applicant: Honeywell International Inc., Morris Plains, NJ (US)

(72) Inventors: Michal Hojsik, Prague (CZ); Lukas Pohanka, Prague (CZ); Harshal Haridas, Jamison, PA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 88 days.

(21) Appl. No.: 16/788,219

(22) Filed: Feb. 11, 2020

(65) Prior Publication Data
US 2021/0250193 A1  Aug. 12, 2021

(51) Int. Cl.
| | | |
|---|---|---|
| *H04L 12/18* | (2006.01) | |
| *H04L 45/16* | (2022.01) | |
| *H04W 12/04* | (2021.01) | |
| *H04W 12/06* | (2021.01) | |
| *H04L 9/40* | (2022.01) | |

(52) U.S. Cl.
CPC .......... *H04L 12/185* (2013.01); *H04L 12/189* (2013.01); *H04L 45/16* (2013.01); *H04L 63/061* (2013.01); *H04L 63/065* (2013.01); *H04L 63/08* (2013.01); *H04W 12/06* (2013.01)

(58) Field of Classification Search
CPC ..... H04L 12/185; H04L 12/189; H04L 63/08; H04L 63/065; H04L 63/061; H04L 45/16; H04L 63/06; H04L 63/0823; H04W 12/06; H04W 12/04
See application file for complete search history.

(56) References Cited

U.S. PATENT DOCUMENTS

| | | | |
|---|---|---|---|
| 7,434,047 B2 * | 10/2008 | Sharma | H04W 12/122 713/163 |
| 10,348,704 B2 | 7/2019 | Figueira | |
| 2010/0064137 A1 * | 3/2010 | McGrew | H04L 9/3242 713/168 |
| 2015/0149767 A1 * | 5/2015 | Oualha | H04L 63/0884 713/155 |
| 2017/0126404 A1 * | 5/2017 | Unagami | H04Q 9/00 |

* cited by examiner

*Primary Examiner* — Asghar H Bilgrami
(74) *Attorney, Agent, or Firm* — Seager, Tufte & Wickhem, LLP

(57) ABSTRACT

Systems for communicating over a network and between two or more network connected devices. In particular, the disclosure reveals systems which may utilize multicast communication protocols to facilitate secure communication among one or more network connected devices. A system for secured messaging may include a network system including a first server, a second server and a first node. Further, the first server is configured to authenticate the first node for secure multicast messaging, and the second server is configured to authenticate the first node for secure multicast messaging.

14 Claims, 12 Drawing Sheets

SYSTEM FOR COMMUNICATION ON A NETWORK

BACKGROUND

The present disclosure pertains to communicating between network connected devices and particularly to mechanisms that improve session key availability and distribution during synchronization needs for multiple group member offline situations.

SUMMARY

The disclosure reveals systems for communicating over a network and between two or more network connected devices. In particular, the disclosure reveals systems which may utilize multicast communication protocols to facilitate secure communication among one or more network connected devices. In some instances, the multicast communication protocols may secure multicast traffic by utilizing symmetric key cryptography. A common session key may be distributed to the one or more network connected devices that intend to participate in securing the multicast traffic. However, in some instances, the guiding mechanisms may not adequately satisfy availability of session key for group members and may introduce complex mechanisms to dynamically handle the joining and/or removal of the one or more network connected devices.

Accordingly, this disclosure introduces mechanisms that improve session key viability and simplifies its distribution during synchronization needs for multiple group member offline situations. In some cases, the mechanisms may establish group member trust with two central controllers in an out of band mechanism. Having more than one controller available to the group members may improve the availability to guard against single controller failures. In some instances, the mechanism may synchronize session keys for a joined node via automatically synchronizing encrypted versions of session keys from controller nodes via a push and/or pull mechanism. In some instances, the mechanism may synchronize session keys for a joined node via automatically synchronizing encrypted versions of session keys from partner nodes over a private out of band path. In other instances, the mechanism may synchronize session keys for a joined node via automatically synchronizing encrypted versions of session keys from other group members. In yet other instances, the mechanisms may introduce seamless transition logic from an older session key to a new session key, a simplified node removal procedure at the controller key server and/or a seamless on-process migration from an existing non-secure deployment to an enforced secured deployment.

DESCRIPTION

Figure 1:
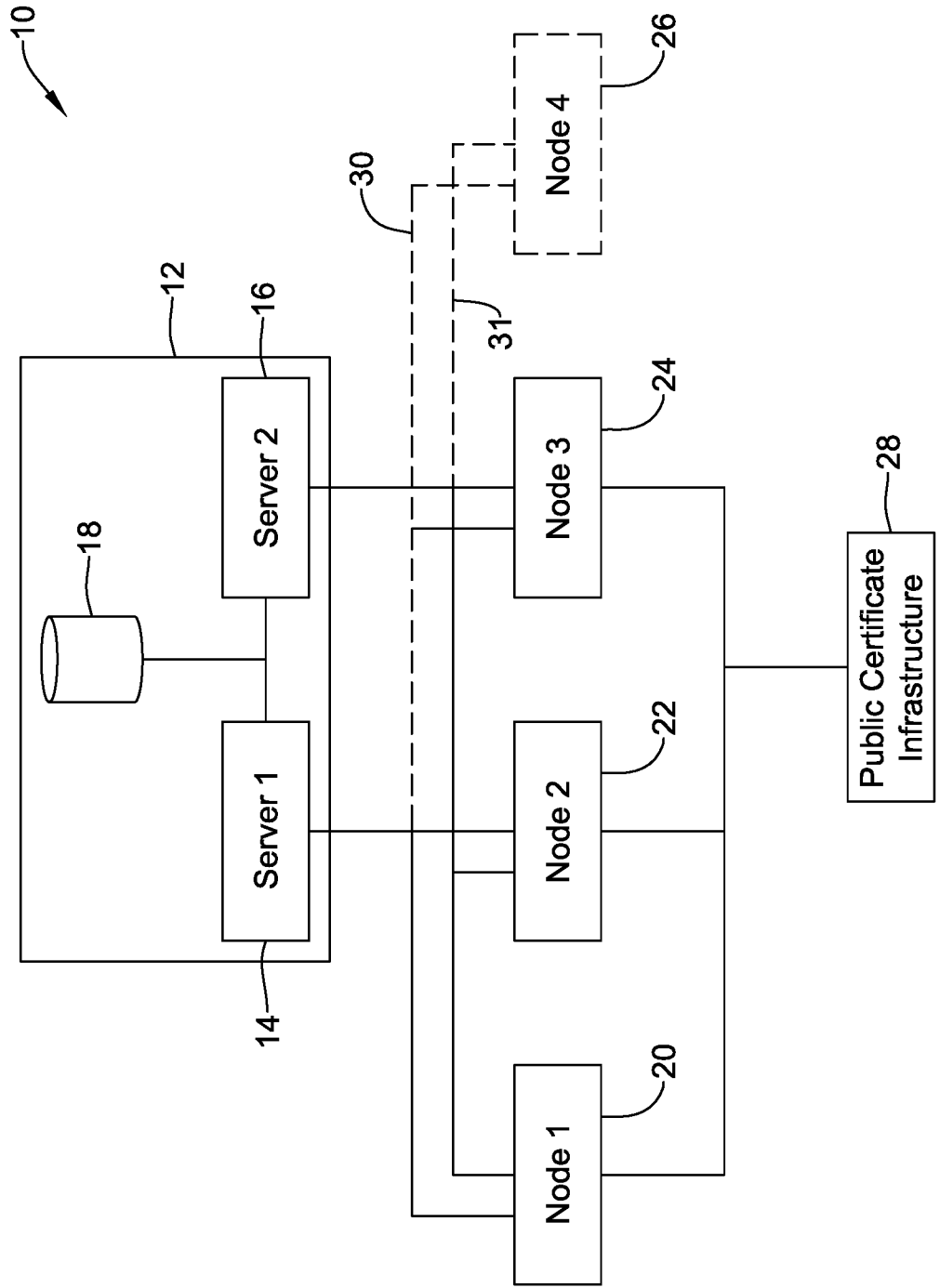
FIG. 1 is a schematic diagram of an illustrative example of network connected devices.

The present system and approach may incorporate one or more sensors, computers, controllers, workstations, servers, user interfaces, and/or the like (e.g., "nodes"), in an implementation described and/or shown herein.

This description may provide one or more illustrative and specific examples or ways of implementing the present system and approach. There may be numerous other examples or ways of implementing the system and approach.

A framework of a standardized system may specify a set of requirements for nodes to communicate over a network (e.g., a multicast communication based network). These requirements may require nodes to respond to multicast and/or unicast traffic originating from a node to allow the node to discover other nodes and the other nodes' services, along with allowing the node to pair with and access the services of the other nodes. However, in some instances, local computer network (LCN) multicast communication may be exposed to a variety of different IP/Ethernet based security exploits. For example, multicast communication on a commercial-off-the-shelf (COTS) based Ethernet network may be vulnerable to increased security risks, making a COTS-based Ethernet network attractive to hackers attempting to gain access to the network. Therefore, securing multicast traffic may provide message integrity and confidentiality, helping to mitigate the increased security risks.

Potential solutions (e.g., group domain of interpretation (GDOI) & internet protocol security (IPsec)) may provide architecture and guiding mechanisms to secure multicast traffic using symmetric key cryptography based on performance considerations. A common session key may be distributed to the nodes that intend to participate in secure multicast traffic. However, the guiding mechanisms may not adequately satisfy availability of session keys for group members and may introduce complex mechanisms to dynamically handle node joining or removal. Further, the guiding members may rely on a single or hierarchy of group key controllers, thereby making it difficult to implement standard recommendations for distributed control system (DCS) implementations. For example, automatic distribution of session keys for spare nodes may not be possible in a replacement scenario. Further, session key distribution may not be possible in reboot scenarios and when the group key controller is unavailable. This disclosure provides mechanisms that improve session key viability and simplifies its distribution during synchronization needs for multiple group member offline and reboot situations.

Some example systems and approaches described herein may include a computing device. In one example, a network utilizing multicast communication protocols described herein may include one or more computing devices. The computing device may include, among other suitable components, a processor, memory, and an I/O unit.

The processor of the computing device may include a single processor or more than one processor working individually or with one another. The processor may be configured to execute instructions, including instructions that may be loaded into the memory and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory of the computing device may include a single memory component or more than one memory component each working individually or with one another. Example types of memory may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory may be or may include a non-transitory computer readable medium.

The I/O units of the computing device may include a single I/O component or more than one I/O component each working individually or with one another. Example I/O units may be any type of communication port configured to communicate with other components of the building management system. Example types of I/O units may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Turning to the figures, FIG. 1 depicts a secure multicast network 10. The network 10 may incorporate one or more networks and may incorporate one or more types of networks. Illustratively, the network 10 may incorporate a local area network (LAN), a wide area network (WAN), and/or one or more other networks connecting two or more computing devices. Although numerous networks may be disclosed as connecting two or more computing devices, these networks 10 may be a single network or several networks.

The secure multicast network 10 may be utilized to secure a multicast communication at various network levels such as Ethernet multicast and/or IP multicast. As illustrated in FIG. 1, the system may include a collection of devices 12 which are in communication with a plurality of nodes (e.g., a first node 20, a second node 22 and a third node 24). For examples, as illustrated in FIG. 1, the collection of devices 12 may include a first group controller key server 14 and a second group controller key server 16. In a general sense, the nodes (e.g., first node 20, second node 22, third node 24) may be entities that participate in the secure multicast communication network at any point in time. As discussed above, the nodes (e.g., first node 20, second node 22, third node 24) may include sensors, computers, controllers, workstations, servers, user interfaces, and/or the like. Further, the secure multicast network 10 may include a group of nodes that communicate using a secure multicast communication protocol.

In some examples, such as that illustrated in FIG. 1, the first node 20, the second node 22, the third node 24 and the fourth node 26 configured to communicate over the secure multicast protocol may form a multicast communication group. In some examples, the main role of the group controller key servers 14/16 is to authorize nodes to join the secure communication group and to distribute session keys (using a multicast message, for example). The group controller key servers 14/16 may also take part in the secure multicast communication group (communicating using a secured multicast communication protocol). The group controller key servers 14/16 may "manage" the secure communication group, but does not have to receive the secured application protocol data.

Additionally, each of the first group controller key server 14 and/or the second group controller key server 16 may be responsible for adding and/or removing nodes from the secure multicast network 10. In some examples, each of the first group controller key server 14 and/or the second group controller key server 16 may regularly distribute session keys to "authorized" nodes (e.g., nodes which meet the security requirements to join the secure multicast network 10). In some examples, the first group controller key server 14 and/or the second group controller key server 16 may distribute session keys to all authorized group members via a "rekey" message.

In some instances, the secure multicast network 10 may utilize public-key cryptography for mutual authentication of nodes with the group controller key servers (e.g., the first group controller key server 14 and/or the second group controller key server 16) and session key distribution and symmetric-key cryptography (using a temporary symmetric session key) for multicast message protection. In some instances, the system may support both authentication-only and authentication and encryption cipher suites. Because it may utilize symmetric key cryptography for multicast message authentication (and possibly also encryption), it may only provide group-authentication.

In some examples, the system may support group controller key servers (e.g., the first group controller key server 14 and/or the second group controller key server 16) in a "redundant" configuration. For example, in some instances each participating node (e.g., first node 20, second node 22, third node 24, etc.) may include the public key credentials 28 of both the first group controller key server 14 and/or the second group controller key server 16 distributed utilizing out of band mechanisms and/or automatically. For example, a node may listen to messages sent by the group controller key servers (e.g., the first group controller key server 14 and/or the second group controller key server 16) and when it receives the message, it may contact a group controller key server and download the credentials of the group controller key server. The node may then verify the credentials using a root of trust (distributed using an out of band channel). This configuration may enable the nodes (e.g., first node 20, second node 22, third node 24, etc.) to authenticate and decrypt messages sent by both the first group controller key server 14 and/or the second group controller key server 16. Further, this configuration may increase the availability of either the first group controller key server 14 and/or the second group controller key server 16, thereby creating additional protection against single failures.

In some instances, the role of the first group controller key server 14 and/or the second group controller key server 16 is to allow users to add and/or remove nodes to a group in which they are allowed to participate. The allowed nodes may be stored in a redundant store 18. Further, the first group controller key server 14 (in a primary role) regularly distributes rekey messages. However, in instances when the first group controller key server 14 (in a primary role) is not available, the second group controller key server 16 (in a back-up role) may take over for the first group controller key server 14. In that instance, the second group controller key server 16 may initiate a new rekey message and continue in a primary role.

To add a node, the first group controller key server 14 and/or the second group controller key server 16 may send a rekey message to distribute a new session key and other system parameters to all participating nodes. For example, each rekey message may be signed by a private key sent by the first group controller key server 14 or the second group controller key server 16 private key and may contain a unique session sequence number (SSN) which may guarantee the authenticity and recency of the message. All the secure multicast communication secured with the session key may contain the session sequence number.

Figure 2:
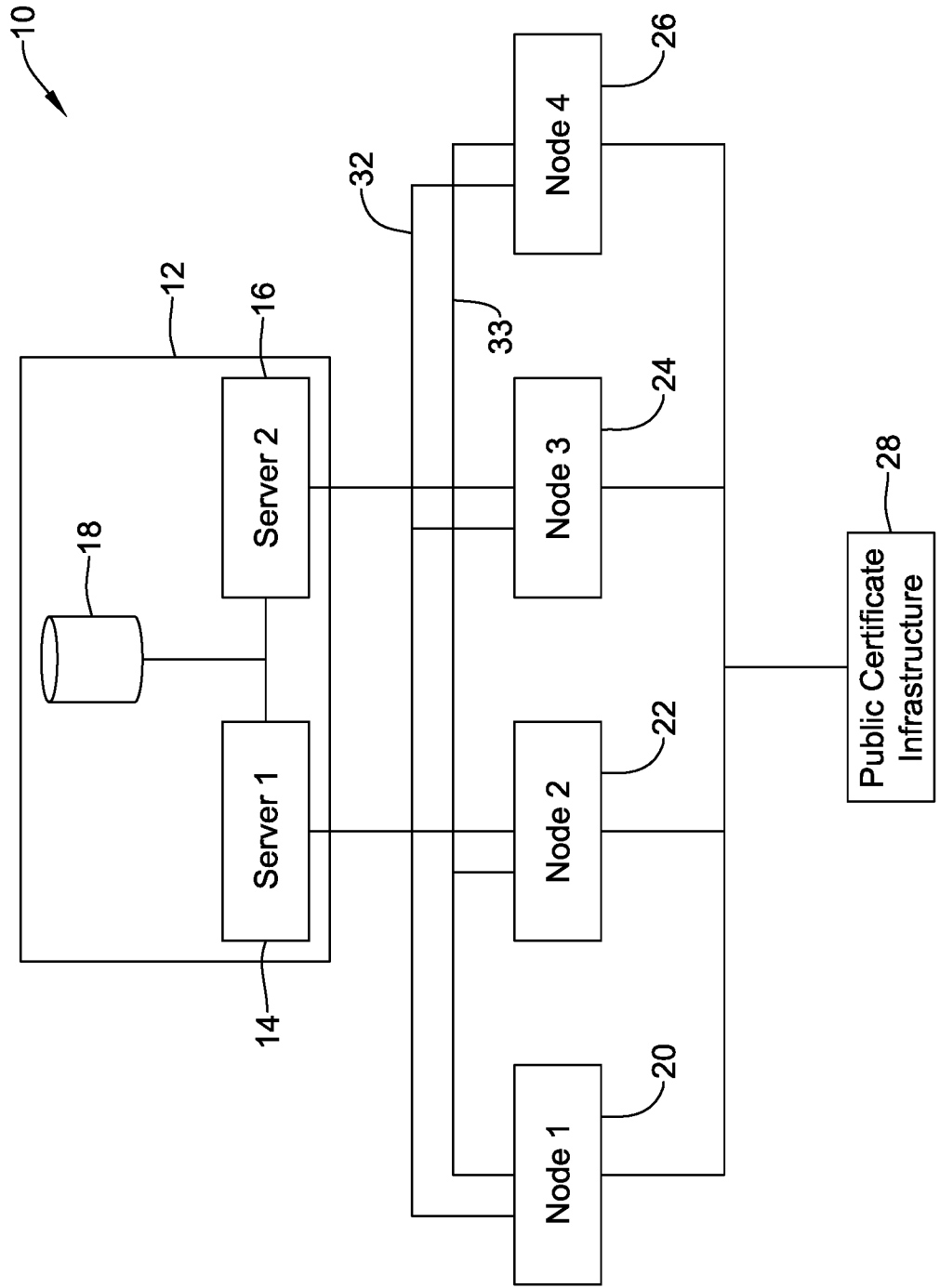
FIG. 2 is a schematic diagram of a further illustrative example system of network connected devices.

FIG. 1 and FIG. 2 (collectively) illustrate the addition of a prospective participating node four 26 to the group of nodes including node one 20, node two 22 and node three 24 according to the methodology described above. FIG. 1 illustrates a potential participating node four 26 (which is shown off the network in FIG. 1 by dashed lines) in potential communication with the first group controller key server 14 (as depicted by the dashed line 30) and also in potential communication with the second group controller key server 16 (as depicted by the dashed line 31). In some examples, the first group controller key server 14 may be defined as a primary server while the second group controller key server 16 may be defined as a back-up server. Further, FIG. 2 illustrates that the node four 26 (which is shown on the network in FIG. 2 by the solid line) in communication with the first group controller key server 14 (as depicted by the solid line 32) and also in potential communication with the second group controller key server 16 (as depicted by the solid line 33).

Figure 3:
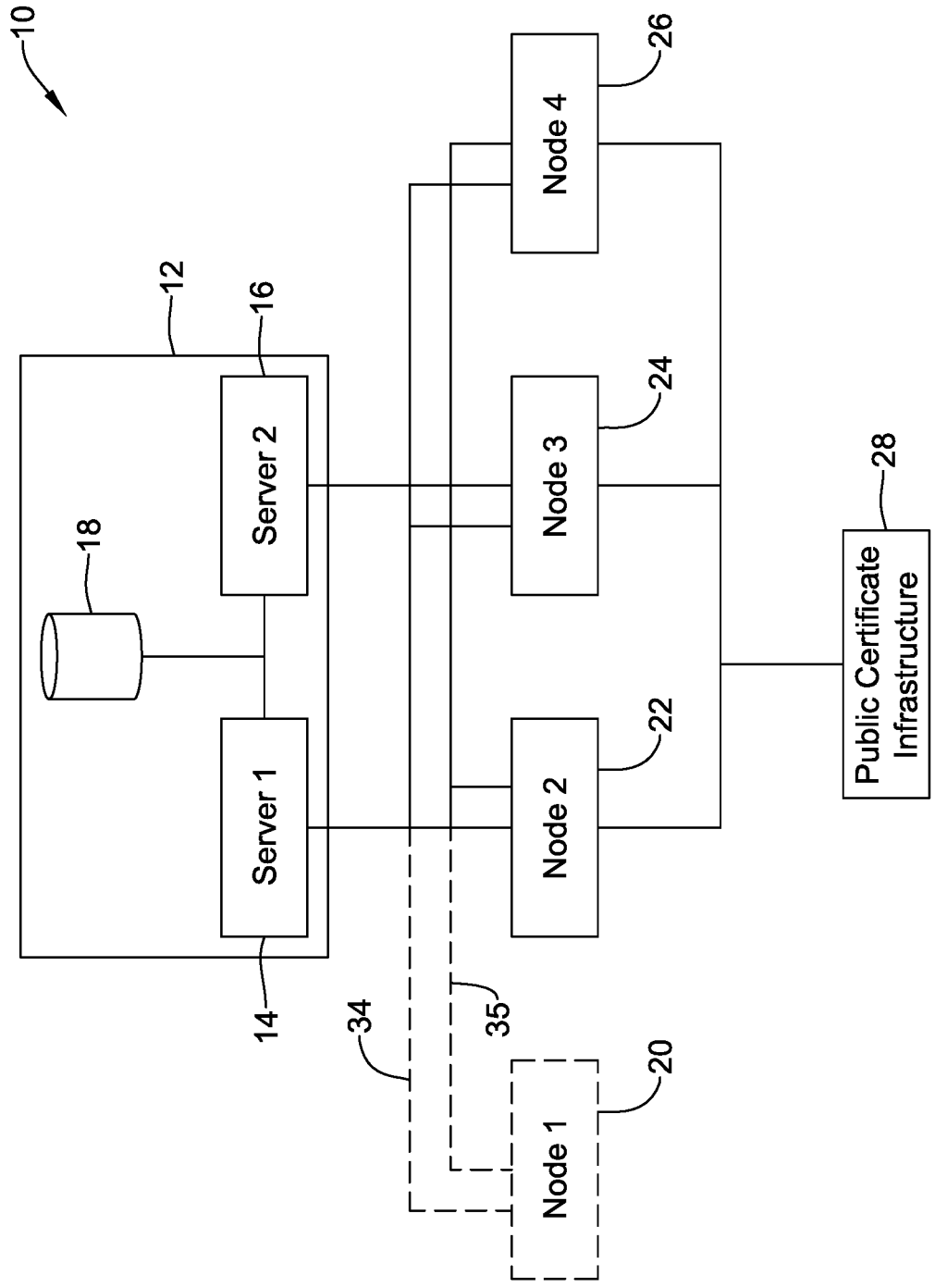
FIG. 3 is a schematic diagram of a further illustrative example system of network connected devices.

FIG. 3 illustrates the removal of the node one 20 (which is shown off the network in FIG. 3 by the dashed lines) from the group of participating nodes (which includes node two 22, node three 24 and node four 26 in FIG. 3). FIG. 3 illustrates the previously participating node one 20 after communication with the first group controller key server 14 (as depicted by the dashed line 34) or with the second group controller key server 16 (as depicted by the dashed line 35) has disconnected node 20 from the network.

In some examples, the rekey message may contain a list of encrypted session keys. Each list element may include a node identifier and contain an encrypted session key for that node. A different key encryption key may be used to encrypt the same session key and may be derived from the private key of the first group controller key server 14 or the second group controller key server 16 and the node's public key using a key-agreement scheme. As a result, nodes with identifiers included in the rekeying message shall be able to retrieve the new session key. By encrypting a session key for each authorized group member, addition or removal of a particular node from a group may be accomplished by sending a new rekey message which adds or omits the given node. In this methodology, only one key management message is required.

Figure 4:
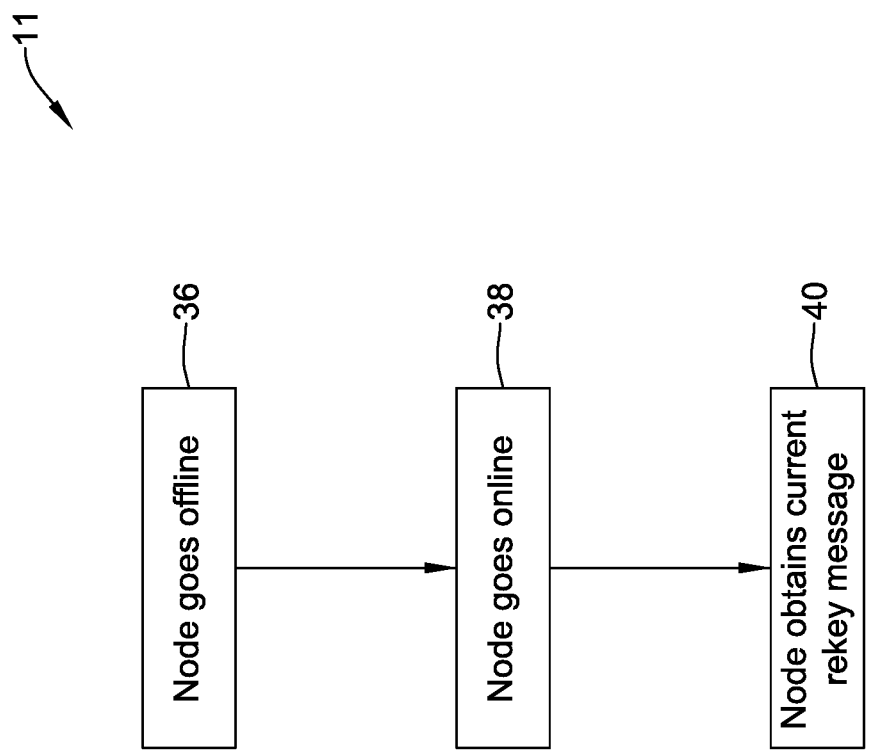
FIG. 4 is a schematic flow diagram of illustrative examples of communications over a network.

In some instances, if a rekey process occurs during a node's down time (e.g., during a time when a reboot of the node is taking place), or the node does not receive the rekey message due to network failure, the node must obtain the latest rekey message to get the current session key. For example, FIG. 4 shows an illustrative example of a node going offline 36, the node coming online 38, followed by the node obtaining the current rekey message 40. The following disclosure describes four ways that a node may obtain the latest rekey message to participate in secure multicast.

Figure 5:
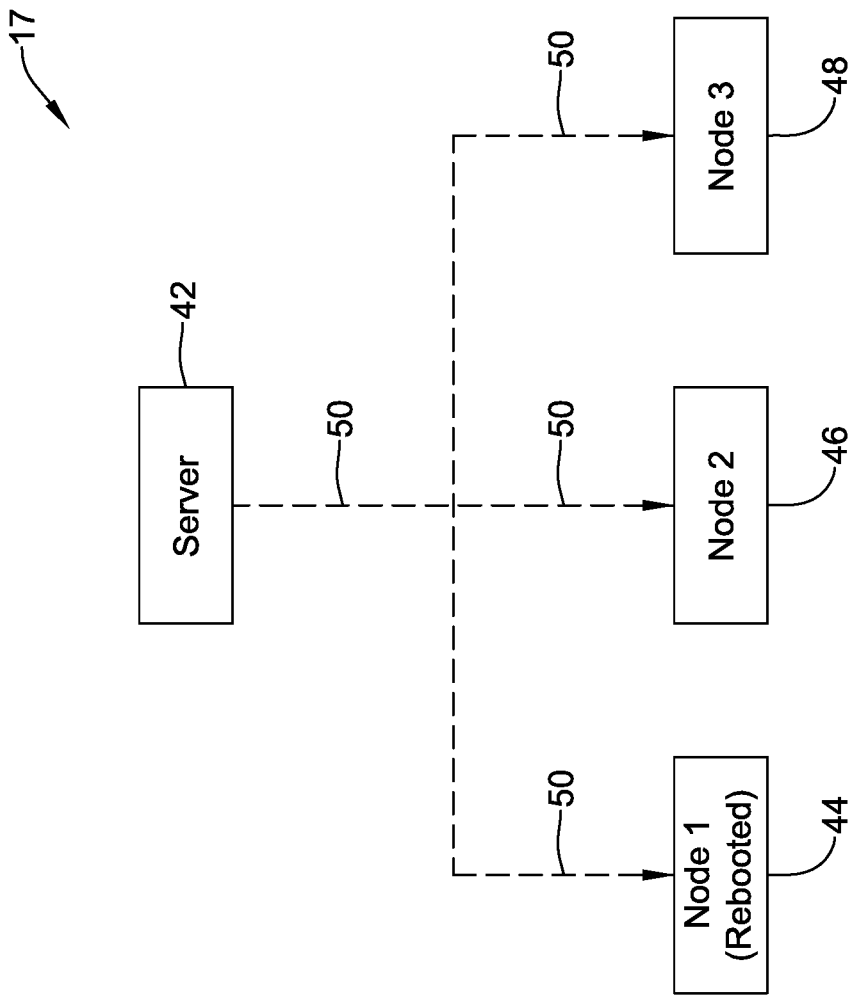
FIG. 5 is a schematic diagram of a further illustrative example of communication between components over a network.

In one example, such as the system 17 shown in FIG. 5, a rekey message 50 may be sent by the first group controller key server 42 (in a primary role). The latest multicast message may be regularly resent by the primary server 42 during the validity period of the session key. However, once the period is over, the primary server 42 may generate a new rekey message containing encrypted newly generated session key and it may send it as a multicast to all participating group members (e.g., node one 44 which is the rebooting node, node two 46, node three 48).

Figure 6:
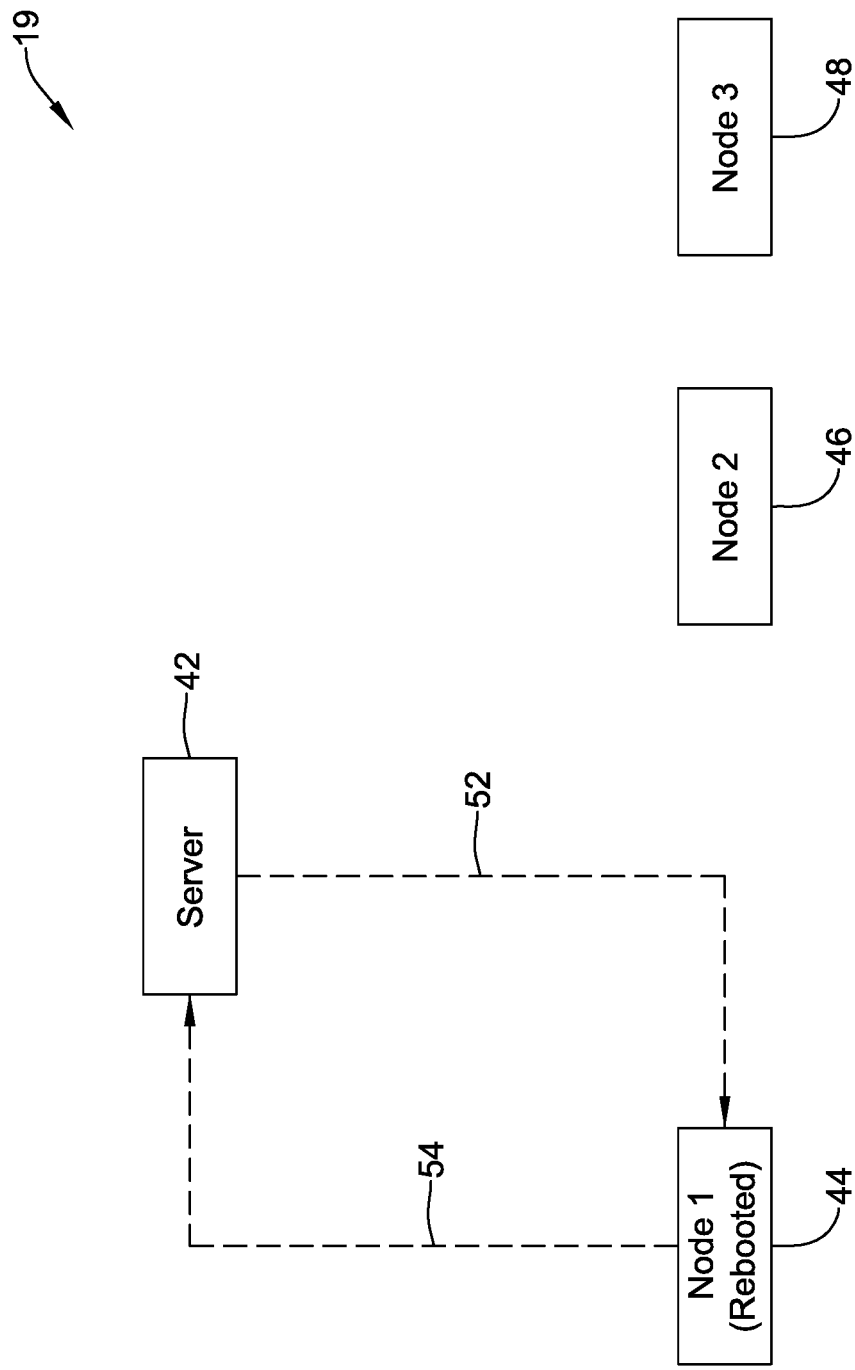
FIG. 6 is a schematic diagram of a further illustrative example of communication between components over a network.

In another example, such as the system 19 shown in FIG. 6, a rekey message 52 may be downloaded by a node (e.g., node one 44 which is the rebooting node), after the node directly contacts 54 the first group controller key server 42 (in a primary role). When a node (such as node one 44) receives a packet with a secure session number higher than it currently has, it may contact the primary server 42 to download the latest rekey message. It should be noted that node two 46 and node three 48 in FIG. 6 may be participating group members, but for simplicity, they are not shown connected to other group members in FIG. 6.

Figure 7:
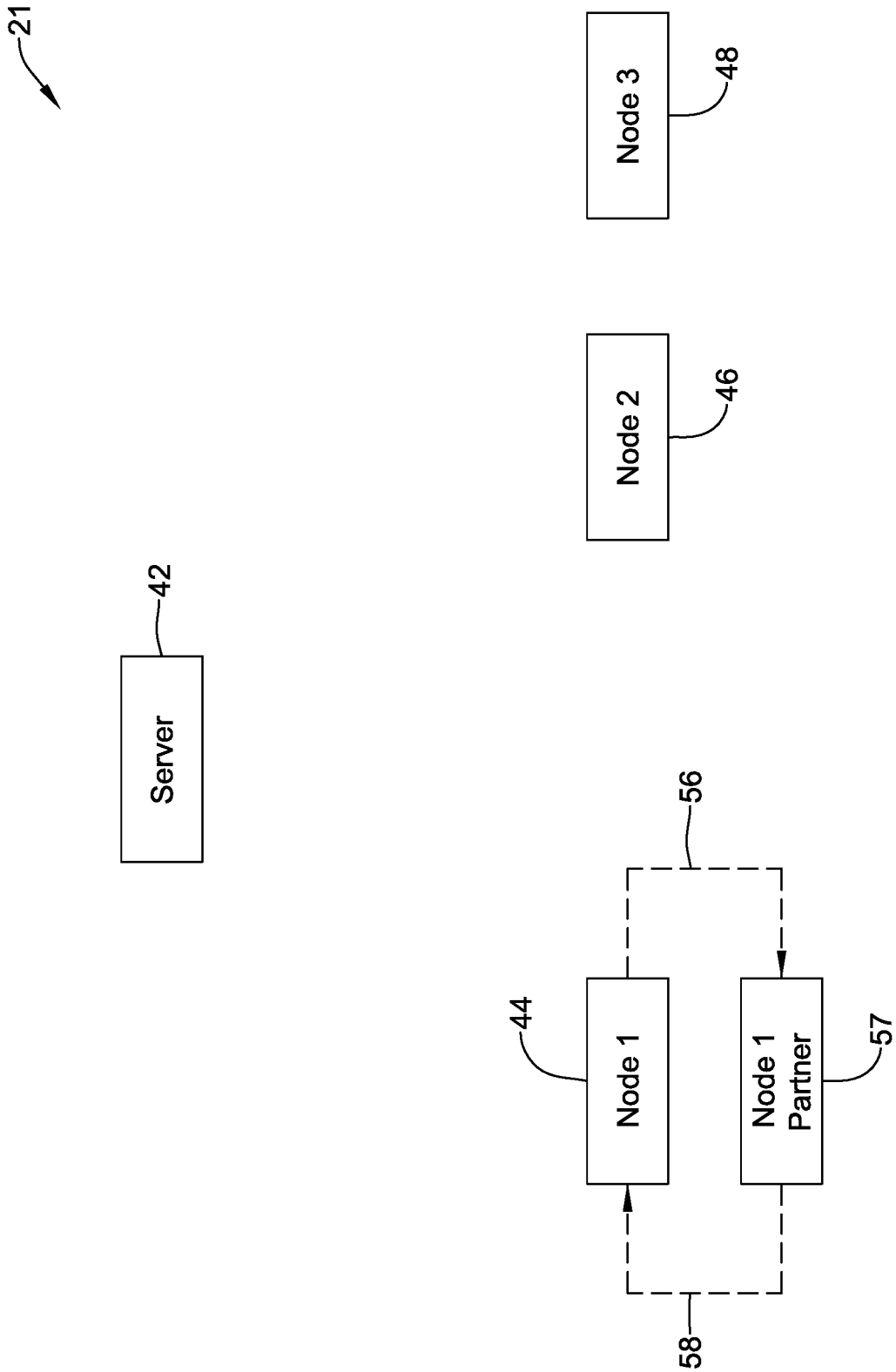
FIG. 7 is a schematic diagram of a further illustrative example of communication between components on a network.

In another example, such as the system 21 shown in FIG. 7, a rekey message 58 may be communicated to a node (e.g., the node one 44) by the node's "redundant partner" node 57 after the node 44 requests 56 the rekey message 58 from the redundant partner node 57. Further, an out-of-band channel from the primary node 44 to the partner node 57 is used to share the latest rekey message 58. Therefore, after a reboot, a partner node 57 may not need to contact the primary server 42 to obtain the latest rekey message. It should be noted that node two 46 and node three 48 in FIG. 7 may be participating group members, but for simplicity, they are not shown connected to other group members in FIG. 7.

Figure 8:
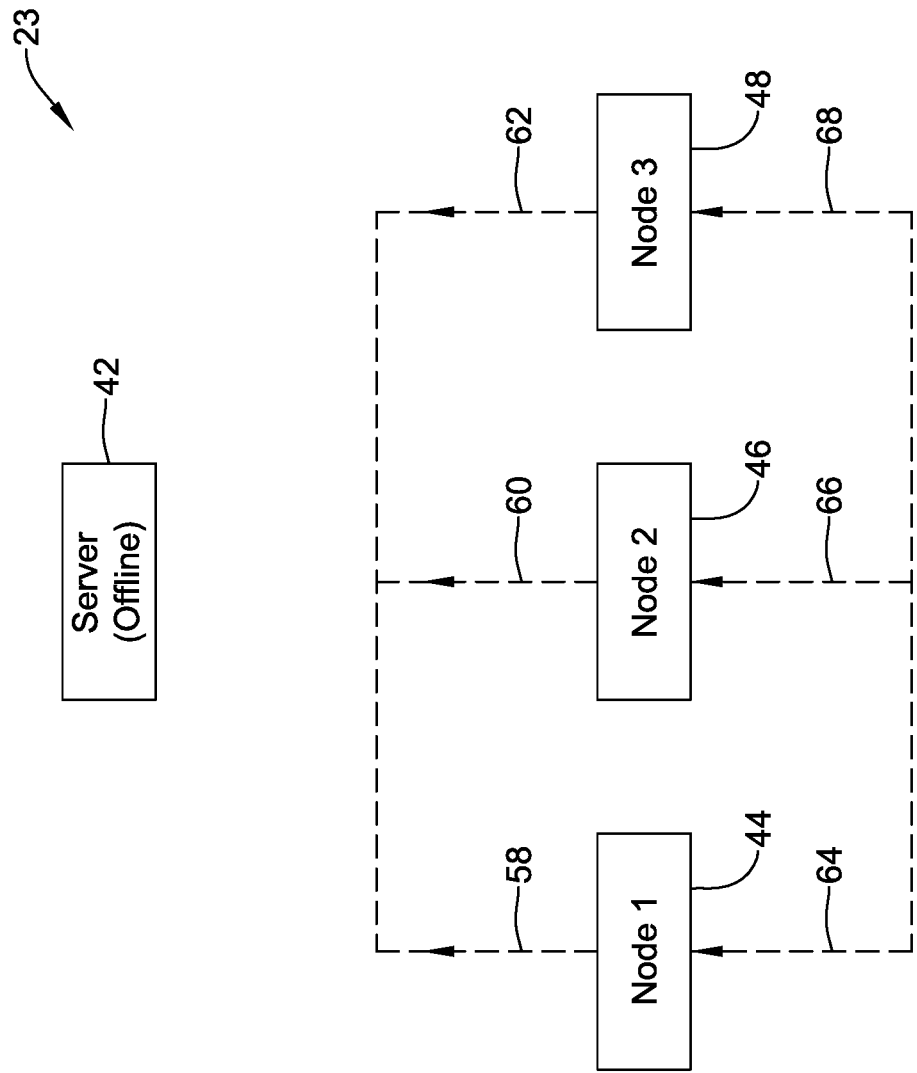
FIG. 8 is a schematic diagram of a further illustrative example of communication between components on a network.

In another example, such as the system 23 shown in FIG. 8, a rekey message may be resent (dashed lines 58/60/62 represent sent rekey messages from their respective group member) from a group member (e.g., node one 44, node two 46, node three 48). For example, each group member 44/46/48 may store the latest rekey message it received (dashed lines 64/66/68 represent rekey messages received by group members). When both the primary server 42 and back-up server (not shown in FIG. 8) are unavailable, individual nodes may start to resend the latest rekey message. When a group member 44/46/48 has not received a rekey message for more than a certain period, it starts a timer with a random initial value. When the timer reaches zero, the node may send its last known rekey message to all other nodes, unless it received it already from some other node that has a shorter random timer.

Figure 9:
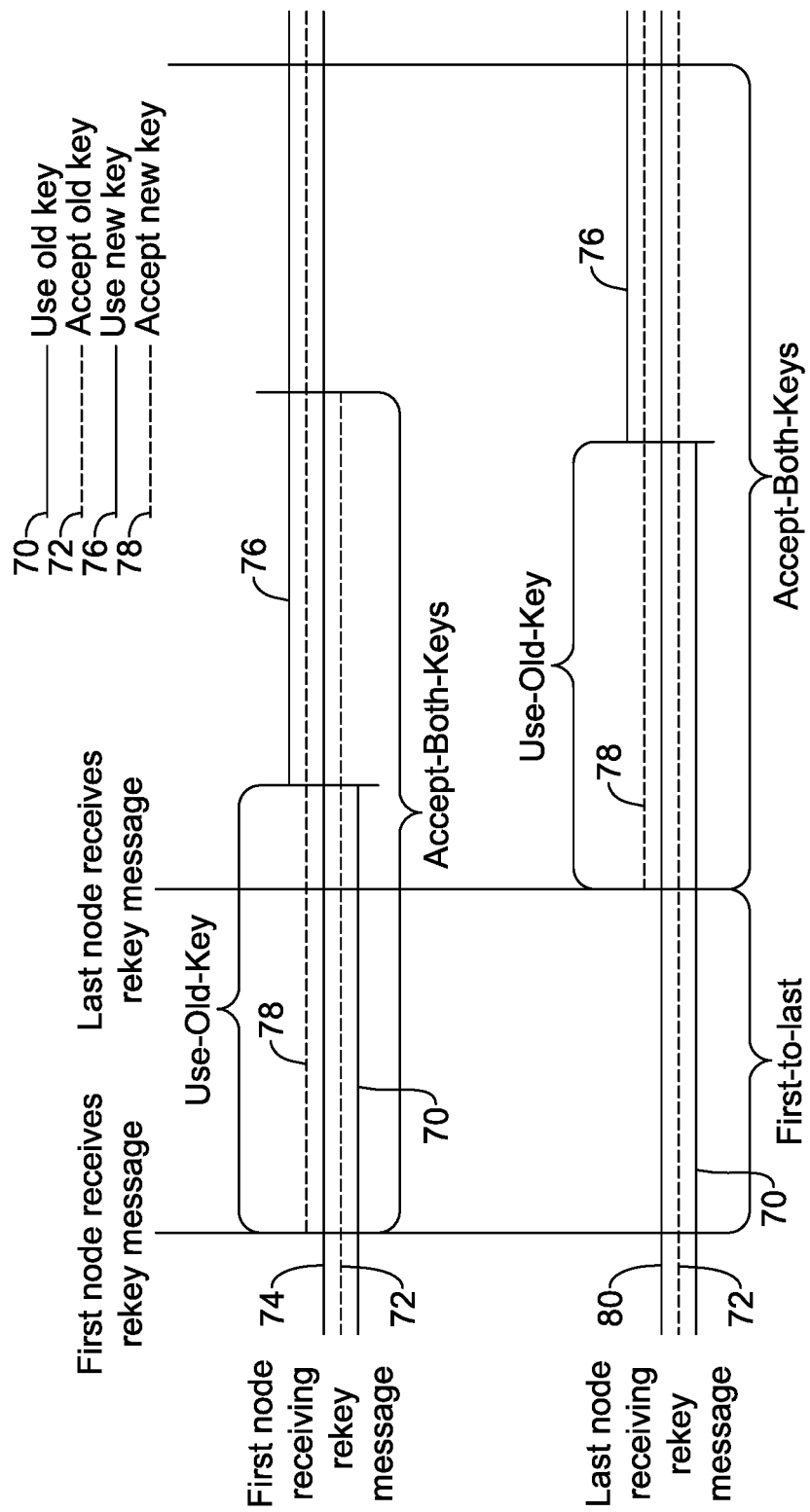
FIG. 9 is a schematic flow diagram of a further illustrative example of node changes during a rekeying process on a network.

Once the session key validity period is over, the group controller key server may send a new rekey message which may start the rekey process on each node. In some instances, it may be desirable to minimize potential communication disturbances during rekey. Accordingly, FIG. 9 illustrates an example methodology showing the relative amount of time that an example first node and an example second node may use a "current key" and/or a "newly received key." It can be appreciated the various lines 70/72/76/78 represent elapsed time (e.g., seconds). In other words, the lines 70/72/76/78 may resemble a relative time line moving from left to right across the page in FIG. 9. A baseline timeline (representing actual elapsed time for which the various lines 70/72/76/78 may be measured against) is depicted as line 74 for the first node and line 80 for the second node.

The methodology may include several parameters. Initially, the first node and the last node receiving the rekeying message may use an old key 70 as well as accept an old key 72. After the first node receives a rekeying message (as illustrated by the vertical line labeled as such), the first node may accept the new key 78 (while still also being able to use an old key 70 as well as accept an old key 72). The next event that may occur is that the last node may receive a rekeying message (as illustrated by the vertical line labeled as such). The method may set an upper limit on the number of seconds that can pass between the processing of a rekey message by the first node and the processing of the rekey message by the last node. This elapsed time is identified as "First-to-last" on FIG. 9. This difference may be due to transportation delays or nodes processing capacity.

After the last node receives the rekey message, the next event which may occur is that the first node may begin to use the new key 76. As shown in FIG. 9, this time point may be coincident with when the first node stops using the old key 70. The time period after either the first node or the second node receives the rekeying message (e.g., obtains a new session key) and when it stops using the old key (e.g., when it starts to use the new key to communication securely) is labeled "Use-Old-Key" in FIG. 9.

Additionally, the time period after either the first node or the second node receives the rekeying message (e.g., obtains a new session key) and when it stops accepting messages secured by the old key is labeled "Accept-Both-Keys" in FIG. 9.

Once a node obtains a new session key from a successfully parsed and verified rekey message, it may immediately start accepting messages secured by that key. The key for which the node uses to verify (and potentially also decrypt) an incoming secure multicast message is determined by the secure session number of the received message. Additionally, to minimize communication disruption a node that received a new key must continue to use the old one until all other nodes in the group receive the new key (e.g., "First-to-last" must be less than or equal to "Use-Old-Key" in FIG. 9). Further, all nodes in the group must accept the old session key as long as there is a node that uses the old key. The node that is using the old key the longest is the last node that obtained the key and it will use it for the time period labeled "Use-Old-Key" in FIG. 9 (e.g., the combined elapsed time of "First-to-last" plus "Use-Old-Key" must be equal to or less than "Accept-Both-Keys" in FIG. 9).

Figure 10:
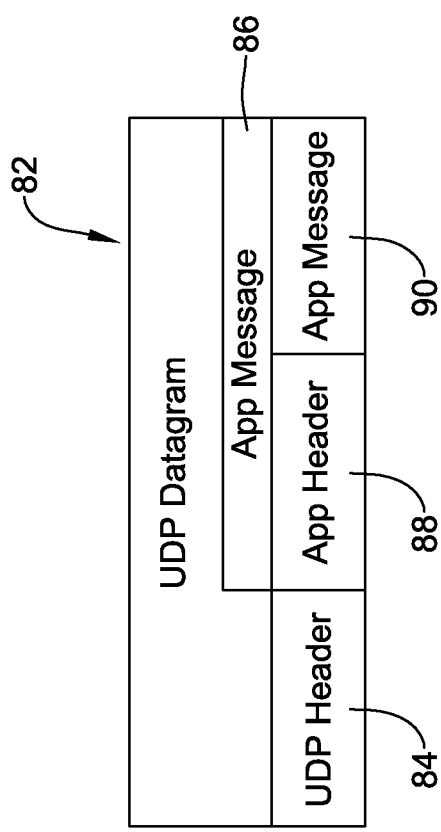
FIG. 10 is a schematic diagram of further illustrative examples of a multicast message.

In some examples, a secure multicast system may support on-process migration from a non-secure multicast protocol to a secure multicast protocol. In some instances, this may be accomplished by adding a security footer instead of a header, by migration to the authentication-only mode first and by having a non-enforcement mode in which secure multicast nodes accept both secured and non-secured messages. FIG. 10 illustrates an example multicast message 82 without a secure footer (prior to the addition of a secure footer). The multicast message 82 may include a UDP header 84 and an app message 86. The app message 86 may further include an app header 88 and another app message 90.

Figure 11:
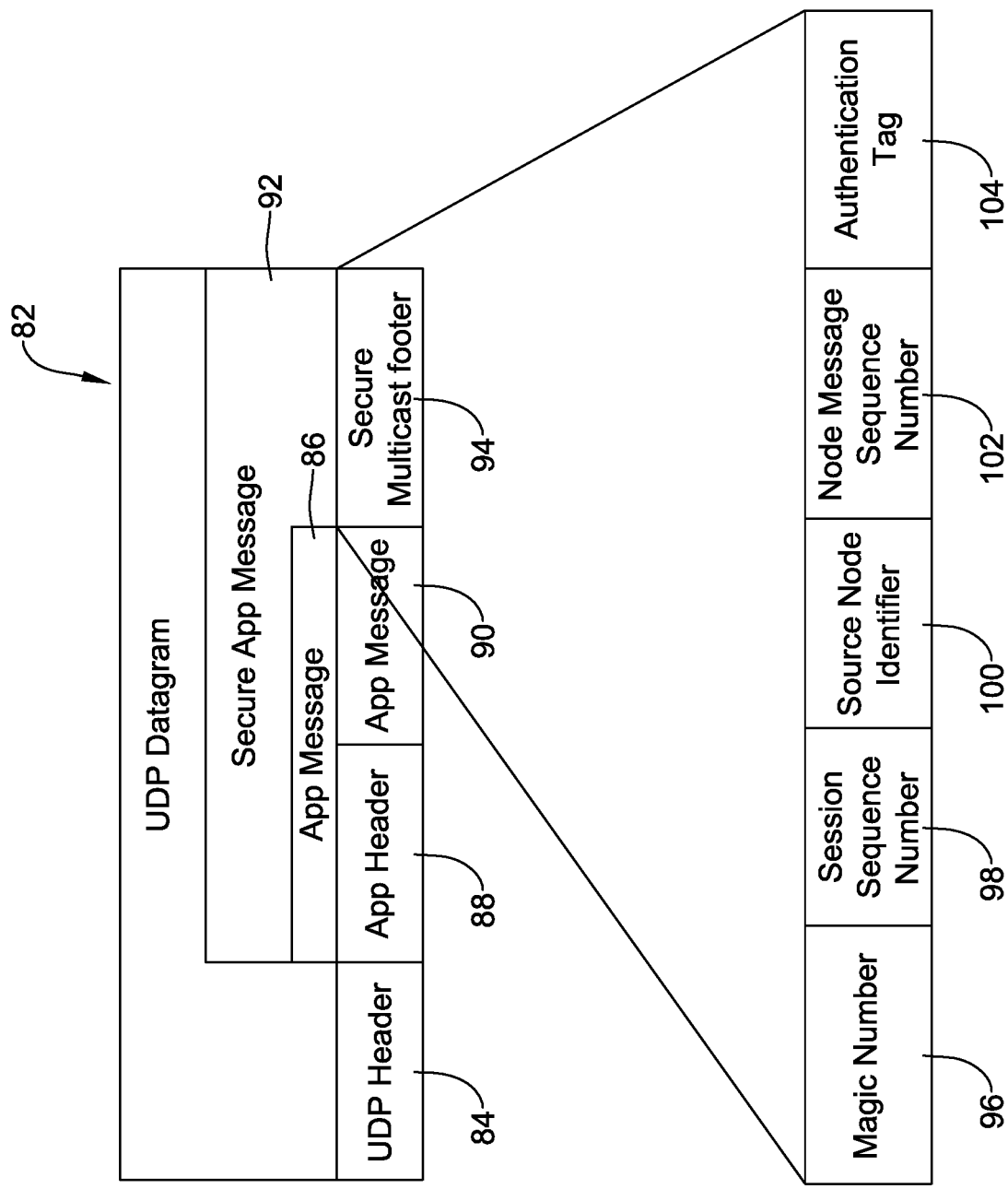
FIG. 11 is a schematic diagram of further illustrative examples of another multicast message.

FIG. 11 illustrates the multicast message 82 after a secure multicast footer 94 is added to the multicast message shown in FIG. 10 to create a secure app message 92. For example, FIG. 11 shows the multicast message 82 including the UDP header 84 and the secure app message 92. The secure app message 92 may include the app message 86 (including the app header 88 and the app message 90). Additionally, the secure app message 92 may further include a secure multicast footer 94. The secure multicast footer may include a magic number 96, a session sequence number 98, a source node identifier 100, a node message sequence number 102 and an authentication tag 104.

Figure 12:
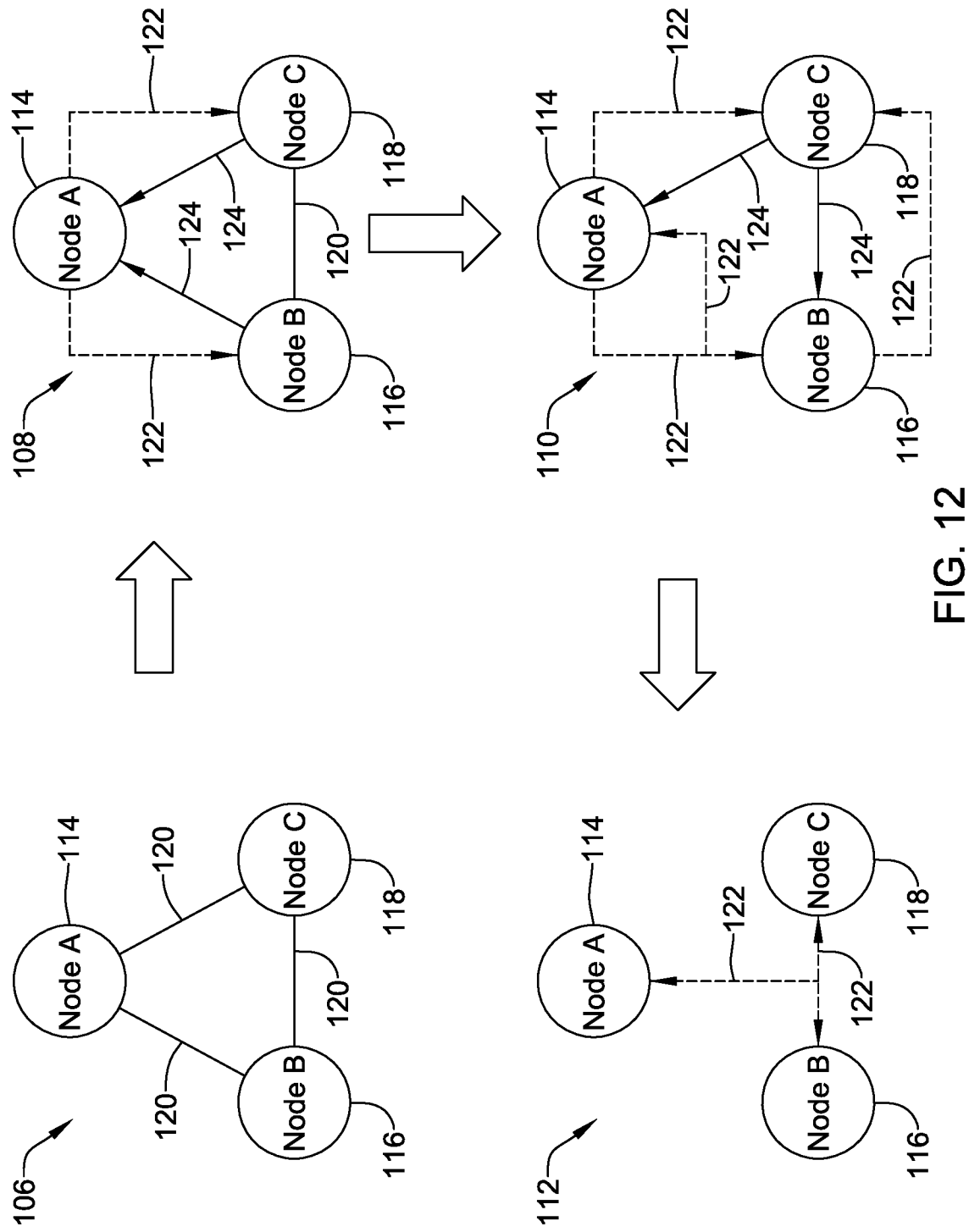
FIG. 12 is a schematic flow diagram of further illustrative examples of on-process migration from a non-secure multicast protocol to a secure multicast protocol.

FIG. 12 illustrates a methodology to accomplish the online migration for a node from a non-secure multicast message to a secure multi-cast message using the techniques described above. Initially, FIG. 12 shows three example nodes (e.g., node A 114, node B 116 and node C 118) that communicate over a non-secure multicast protocol P. The multicast protocol P may be an application protocol that communicates via UDP/IP multicast.

In order to migrate the multicast protocol P from the non-secure network to a secure network, a security footer which carries information about the message data and an authentication tag may be utilized. In authentication-only secure multicast, the protocol data unit (PDU) or app message may not be changed and only a security footer (containing an authentication tag) may be appended to the protocol's PDU before it is handed to underlying transport for transmission. If the upper layer protocol contains (in its header) information on the protocol's PDU, the protocol's PDU with appended security footer is still a valid protocol's PDU.

As discussed above, FIG. 12 initially shows node A 114, node B 116 and node C 118 in a non-secure multicast arrangement 106. The non-secure communication pathways on the network are depicted by the solid lines 120.

Migration of the group of nodes from a non-secure to secure multicast network may initially include enabling the node A 114 with authentication-only mode and while also still being able to communicate in the non-enforcement mode. Node A 114 initially starts to send secured PDU's 122 (e.g., PDU's with added security footer) to node B 116 and node C 118, as shown in the network configuration 108. The node B 116 and node C continue to communicate in a non-secure mode 120. Further, the node B 116 and the node C 118 may interpret node A's 114 secure PDU's as valid protocol P's PDUs. When node A 114 receives a message from a non-secured node 116 B and/or node 118 C (e.g., depicted as the solid lines 124), it may accept it because it may be configured in non-enforcement mode.

Next, as shown in the network configuration 110, the node B 116 may be enabled with secure multicast (e.g., authentication-only mode). Node B 116 may begin sending secured PDU's 122 that node A 114 may verify and the node C 118 may interpret as protocol P's PDUs. Node B 116 may accept and verify messages 122 from node A 114 and, due to also being able to communicate in non-enforcement mode, may also accept messages from node C 118 (the outgoing messages from node C are depicted by the solid lines 124).

Network configuration 112 illustrates the network after all the nodes have been migrated to a secure protocol P. After all the nodes have been migrated to the secure protocol P, the non-enforcement mode may be turned off and all the nodes will only accept secure protocol P messages.

A recap may be provided in the following. A system for secured messaging may include a network system including a first server, a second server and a first node. Further, the first server is configured to authenticate the first node for secure multicast messaging the second server is configured to authenticate the first node for secure multicast messaging.

The first server of the system for secured messaging may be configured to authenticate the first node when the second server is not connected to the network.

The second server of the system for secured messaging may be configured to authenticate the first node when the first server is not connected to the network.

The first server, the second server and the node of the system for secured messaging may communicate using a secured multicast communication protocol.

The second node of the system for secured messaging may be connected to the network system, where the first server is configured to authenticate the second node for secure multicast messaging, and where the second server is configured to authenticate the second node for secure multicast messaging.

The first server of the system for secured messaging may be configured to authenticate the first node by distributing a first session key, and the second server may be configured to authenticate the first node by distributing a second session key, where the second session key is different from the first session key.

The first node of the system for secured messaging may include a first public key credential configured to authenticate the first session key and a second public key credential configured to authenticate the second session key.

Another system for reconnecting nodes in a secure multicast network may include a first node configured to communicate using a secure multicast communication protocol on the secure multicast network and one or more nodes configured to communicate with the first node using the secure multicast communication protocol on the secure multicast network. Further, when the first node disconnects from the secure multicast network and attempts to reconnect to the network, then the first node may perform a network re-authentication.

In the system for reconnecting nodes in a secure multicast network, performing a network re-authentication may further include a request for a session key.

In the system for reconnecting nodes in a secure multicast network, the request for a session key may further include outputting a request to a server and receiving a session key from the server.

In the system for reconnecting nodes in a secure multicast network, if the received session key is not the latest session key, the first node may send a request for the latest rekey message.

In the system for reconnecting nodes in a secure multicast network, the request for the session key may include outputting a request to a second node of the one or more nodes.

In the system for reconnecting nodes in a secure multicast network, the first node may be configured to receive the session key from the second node.

In the system for reconnecting nodes in a secure multicast network, the first node may receive the session key from the second node on an out-of-band channel.

In the system for reconnecting nodes in a secure multicast network, a first server connected to the secure multicast network configured to communicate with the first node and the one or more additional nodes, where the first node and the one or more additional nodes are configured to detect when the server disconnects from the network, and upon detection of the server disconnecting, the one or more nodes sends the latest session key.

In the system for reconnecting nodes in a secure multicast network, the network re-authentication may include receiving the message outputted from the one or more nodes.

A method of communicating over a network may include connecting a plurality of nodes to a network. The nodes may be configured to communicate over the secure multicast network and a disconnected node of the plurality of nodes may perform a network re-authentication, and the network re-authentication may include receiving the latest session key.

The method of communicating over a network may include the disconnected node receiving the latest session key from another node of the plurality of nodes.

The method of communicating over a network may include the disconnected node receiving the latest session key from a first server connected to the secure multicast network.

The method of communicating over a network may include a secure multicast network including a first server and a second server, and where the disconnected node may receive the latest session key from the second server if the first server is disconnected from the secure multicast network.

A method of secure messaging over a network may include a plurality of nodes communicating on a secure network using a first session key, a first node of the plurality of nodes receiving a new session key at a first time, the first node accepting communications from each of the plurality of nodes using the first session key for a first predetermined time period after receiving the new session key, a second node of the plurality of nodes receiving the new session key at a second time after the first time, and the second node using the first session key to communicate over the network for a second pre-determined time period after receiving the new session key. The first predetermined time period may expire after the second predetermined time period expires.

A method of creating a secure datagram, may incorporate defining a datagram header, and defining a secure application message. The defining the secure application message may include defining an application message and a defining a secure multicast footer. The secure multicast footer may include an authentication tag.

A method of converting an unsecure multicast network to a secure multicast network, may incorporate sequentially enabling secure communications on each node of a plurality of nodes. Each of the plurality of nodes having secured communication enabled may be initially configured in a non-enforcement mode and output secure multicast messages. Once each of the plurality of nodes has secured communications enabled, switching each of the plurality of nodes from a non-enforcement mode to an enforcement mode, each of the plurality of nodes in the enforcement mode may accept only secured multicast messages.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to incorporate all such variations and modifications.

What is claimed is:

1. A system for secured messaging, comprising:
a network system including a first server, a second server, a first node, and a second node; and
wherein:
the first server is configured to authenticate the first node for secure multicast messaging;
the second server is configured to authenticate the first node for secure multicast messaging;
the first server is configured to authenticate the second node for secure multicast messaging;
the second server is configured to authenticate the second node for secure multicast messaging; and
the first node and the second node are configured to communicate on an out-of-band channel.

2. The system of claim 1, wherein the first server is configured to authenticate the first node when the second server is not connected to the network.

3. The system of claim 1, wherein the second server is configured to authenticate the first node when the first server is not connected to the network.

4. The system of claim 1, wherein the first server, the second server and the node communicate using a secured multicast communication protocol.

5. The system of claim 1, wherein the first server is configured to authenticate the first node by distributing a first session key, and wherein the second server is configured to authenticate the first node by distributing a second session key, wherein the second session key is different from the first session key.

6. The system of claim 5, wherein the first node includes a public key credential configured to authenticate the first session key and the second session key.

7. A system for reconnecting nodes in a secure multicast network, comprising:
a first node configured to communicate using a secure multicast communication protocol on the secure multicast network; and
one or more nodes configured to communicate with the first node using the secure multicast communication protocol on the secure multicast network;
wherein when the first node disconnects from the secure multicast network and attempts to reconnect to the network, then the first node performs a network re-authentication;
wherein performing a network re-authentication further includes a request for a session key;
wherein the request for the session key includes outputting a request to a second node of the one or more nodes;
wherein the first node is configured to receive the session key from the second node; and
wherein the first node receives the session key from the second node on an out-of-band channel.

8. The system of claim 7, wherein the request for a session key further includes outputting a request to a server and receiving a session key from the server.

9. The system of claim 8, wherein if the received session key is not the latest session key, the first node sends a request for the latest rekey message.

10. The system of claim 7, further comprising a first server connected to the secure multicast network configured to communicate with the first node and the one or more additional nodes, wherein the first node and the one or more additional nodes are configured to detect when the server disconnects from the network, and upon detection of the server disconnecting, the one or more nodes sends the latest session key.

11. The system of claim 10, wherein the network re-authentication includes receiving the message outputted from the one or more nodes.

12. A method of communicating over a network, the method comprising:
connecting a plurality of nodes to a network; and
wherein:
the nodes are configured to communicate over the secure multicast network;
a disconnected node of the plurality of nodes performs a network re-authentication;
the network re-authentication includes receiving the latest session key;
the disconnected node receives the latest session key from another node of the plurality of nodes; and
the disconnected node is configured to receive the latest session key from another node of the plurality of nodes on an out-of-band network.

13. The method of claim 12, wherein the disconnected node is configured to receive the latest session key from a first server connected to the secure multicast network.

14. The method of claim 12, wherein the secure multicast network includes a first server and a second server, and wherein the disconnected node is configured to receive the latest session key from the second server if the first server is disconnected from the secure multicast network.

* * * * *